United States Patent [19]

Wason

[11] 4,438,434
[45] Mar. 20, 1984

[54] SELF-SEQUENCING DATA BUS ALLOCATION SYSTEM

[75] Inventor: Thomas D. Wason, Raleigh, N.C.

[73] Assignee: Cain Encoder Company, Greenville, N.C.

[21] Appl. No.: 287,396

[22] Filed: Jul. 27, 1981

[51] Int. Cl.³ .............................................. H04Q 9/00
[52] U.S. Cl. ........................... 340/825.51; 340/825.05
[58] Field of Search ........... 340/825.5, 825.51, 825.37, 340/825.01, 825.05, 518; 178/3; 364/200; 370/108, 4

[56] References Cited

U.S. PATENT DOCUMENTS

| | | | |
|---|---|---|---|
| 3,461,445 | 8/1969 | Luehrmann et al. | 340/825.37 |
| 4,148,011 | 4/1979 | McLagan et al. | 340/825.5 |
| 4,245,342 | 1/1981 | Entenman | 340/825.01 |
| 4,292,623 | 9/1981 | Eswaran et al. | 178/3 |
| 4,313,192 | 1/1982 | Nelson et al. | 370/108 |
| 4,360,870 | 11/1982 | McVey | 364/200 |

OTHER PUBLICATIONS

"Multiplex Interface Selection Circuit", L. T. O'Connor, Jr., IBM Tech. Disc. Bulletin, vol. 7, No. 7, Dec. 1964, pp. 592, 593.

Primary Examiner—Donald J. Yusko

[57] ABSTRACT

A plurality of data communication devices of the type which operate to communicate with a data bus responsive to the receipt of a prescribed voltage are triggered automatically in a prescribed sequence without separate addressing from a central point. Each data communication device (which may be uni- or bi-directional) is connected to a common multi-wire electrical cable by means of a control station, which taps a power supply line from the main cable and directs the power to its corresponding data communication device. The data communication device is thus activated so as to permit it to transmit its data onto the data bus of the main cable. Upon completion, the data communication device ceases drawing power which indicates to the system that it has finished, whereupon the next-in-line control station initiates the process with its corresponding data communication device.

8 Claims, 3 Drawing Figures

SELF-SEQUENCING DATA BUS ALLOCATION SYSTEM

BACKGROUND AND SUMMARY OF THE INVENTION

The present invention is directed to a simple system for sequentially allocating the use of a data bus to individual members of a series of data communication devices. There are presently available various communication devices such as computer terminals, printers and the like which are capable of transmitting and/or receiving data over a data bus. In addition, there are presently available various communications devices for remotely reading such instruments as electrical meters, gas meters, and the like. One such device is illustrated and described in U.S. Pat. No. 4,007,454 to Cain et al. Generally, and as use herein, these devices can be activated or initiated by the receipt of a trigger voltage and can be made to stop drawing current when the data exchange is completed. There are basically two known methods for sequentially acquiring data from a plurality of such data communication devices.

In one, each communication device is equipped with a data bank where data is continuously accumulated and stored in some type of storage member. When the storage member is addressed by a computer, it feeds back the information stored therein. Sequencing of a plurality of such devices is thus accomplished by the computer itself. An example of this type of system is shown in U.S. Pat. No. 3,962,545 to Abe and in U.S. Pat. No. 4,059,727 to Kingswell et al. In these systems the data storage bank and the computer addressing make the systems complicated and expensive, even though the resulting signals may be transmitted over a common telephone line.

In a second approach, a central computer or addressing device is connected to each data communication device by separate wire leads. Then the central computer or addressing device is pre-set to address each communication device according to a preferred pattern. This requires an excessive amount of wire and the installation thereof, is very difficult to add instruments once initial wiring is completed, and is relatively slow compared to the present system.

One further system is illustrated and described in the Neuville et al U.S. Pat. No. 3,662,366 in which a polling system includes a plurality of relatively complex transfer members. In this particular system the electrical system includes each device to be read which has alternating conducting and non-conducting areas thereon. Each transfer member includes a pair of contacts in engagement with the surface of the device to be read. As each transfer member is successively activated in a series of successive scanning cycles, a computer is able to tell the condition (on or off) of each device being scanned. No data is put onto a data bus, bidirectional flow of information cannot take place and each transfer member is activated for a prescribed time interval as preset in the transfer member.

In the present invention, on the other hand, a relatively simple approach is utilized for sequentially allocating the use of a data bus to individual members of a series of data communication devices. The bus used may be parallel (as for communication between microprocessors), or serial (as for example RS-232C as widely used in telephonic data communication) and the data may be analog or serial and may be as complex as desired. In the present invention, as differentiated from the Neuville approach, the receipt of a control signal causes a transfer station to tap a voltage from the supply line, to gate this voltage to its corresponding data communication device so long as current is drawn from the supply line by the data device, and to permit the data device to transmit data onto the bus during the time interval (which may be of arbitrary and/or differing duration) as determined by the device being controlled. Upon completion, the data communication device then ceases to draw current, causing the transfer member to pass the control voltage onto the next-in-line station. Each device in the series may receive data from ("listen to") the bus at all times during this process; when (and only when) its turn is reached the device may transmit data onto ("talk to") the bus as long as it continues to draw current from the supply line.

In general then the present system is directed to the allocation of data transmission opportunity among members of a plurality of data communication devices in accordance with a prescribed sequence. Rather than having the sequencing controlled by a central addressing system, each station on the electrical line activates the next station at the completion of transmission with no appreciable delays. Toward this end there is provided a voltage source and a main electrical cable including at least a supply line and preferably at least one separate data line. The supply line connects the voltage source to a plurality of control means, each of which is electrically connected to a corresponding data communication device by an electrical branch cable having at least a supply line and preferably one data line. Each of the control means includes a switch device operable between a normal position and a second position for tapping current from the main cable supply line and gating the current at the same voltage to the supply line of the corresponding branch cable and thus on to the data communication device, thereby activating the same to transmit data onto the branch data line and back onto the main data line or bus. Alternatively, as will be explained below, the gating of current to a branch line may be so arranged that the supply line current is temporarily withheld from the downstream stations. Once the upstream or "activated" data communication device has completed transmission of its data, a silicon controlled rectifier or some other switching device either already available or built into the data communication device changes its state, thus terminating the flow of current therethrough. A current sensing means detects the lack of current through the branch cable, returns the switching means to the normal (non-conducting) position, and signals the next-in-line control means to be activated. Thus the present invention allows the inexpensive construction of a simple multi-port data link. Note that in the foregoing, "voltage" and "current" have been referred to. It will be clear to those skilled in the art that the two terms are interchangeable in this discussion because it is the term "power" that is really the significant term, rather than either of its components. The three terms may be referred to hereinafter, but are considered interchangeable.

One way, of course, to trigger the entire sequence is to change the voltage on the supply line from zero to a designated high level which will initiate a sequence of readings from the entire line of data communication devices. Alternately the supply line can substantially be held at a maximum voltage level and the sequence can be triggered when desired with no more than a brief negative pulse on the supply line, whereby the supply line may be used to power other devices when the sequencing is not in progress. As another alternative, individual control means may be arranged to respond only to supply voltages above a predetermined threshold, below which voltage level the supply line may be used for other purposes.

The data communication devices are herein assumed to be generally low power devices which can derive all of their operating power from the supply line. This is not a strict requirement, however, as other types of data communication devices might simply sink current or switch current to ground to indicate that they are, or are about to be, putting out data, while deriving their operations power from other sources.

When the system is not being used to transmit data as described above, the same lines are available for other purposes, such as fire alarms, burglar alarms, intercoms, etc. The system preferably uses inexpensive, four wire telephone cable and greatly simplifies installation in that only a single cable need be strung through a building. The line is then cut at desired places, and control devices inserted and installed where needed to run to different data devices. If a control device is installed without a corresponding data communication device the system simply sequences over that control device with no appreciable delay or an indentifier is inserted for the data communication device as described hereinafter. Thus, control devices for further use can be installed during the initial installation or during construction, or they may be installed at any time subsequent to construction or installation of the electrical wiring.

The system according to the present invention does not require that a central addressing system send out some sort of code over the data lines requesting each control device to respond. This "dumb" feature allows the use of simple equipment for requesting and transmitting data, and eliminates the need for a "boss" computer to monitor the system's operation. Moreover, since all data devices may listen to the data bus even while awaiting the opportunity to transmit, communication between devices is enabled without intervention by a central monitoring device.

The present construction lends itself to additional types of self-sequencing control devices which are responsive to the cessation of power draw by the device controlled. Included for example are such devices as:

(a) branchers which allow branched cables to be added to the main cable, awaiting cessation of current flow in the branched cable before returning to the main cable and advancing to the next-in-line position;

(b) repeaters which are boosters for amplifying or squaring the data signals on the data bus for long cable runs;

(c) identifiers which are in essence data communication devices incorporated into control means for producing a prescribed identification code on the data bus when it is sequenced but transmitting no data other than a pre-set input. Thus the number sequence can be repeated after passing the identifier which effectively provides a prefix for units in a second section of the system;

(d) terminators which are placed at the end of the circuit to act as a reliability check and indicate by generating a predetermined code such as "00" or the like that the entire sequence of readouts has been completed.

There is thus provided by the present invention an improved method and system for self-sequencing a series of data communication devices to transmit data onto a common data bus. It should be kept in mind that in the preferred embodiment while each data communication device is activated in turn to transmit, each can receive data at any time since they are all connected to the common data bus. Each data communication device is activated in sequence, transmits data onto a data bus for as long as is necessary, deactivates and causes the system to shift to the next station. The sequencing of the system can be initiated by a threshold or trigger voltage, or by such other devices as a computer address or the occurrence of a predetermined event and by monitoring the power drawn by each device, the system is self-sequencing once initiated. The system utilizes a power supply line which both provides power to the data communication device being read and produces the self-sequencing results. Power is only supplied to one data communication device at a time, therefore a small amount of power suffices. Should one control station not yet have a data communication device connected thereto or should the communication device draw no current because of a malfunction, the system automatically skips such station because no current is being drawn. As presented herein, a given control means delivers a supply voltage to its data device and continues to do so as long as the device draws current. It will be clear to those skilled in the art that the control means can equally well deliver a supply *current* to the device so long as a voltage drop associated with the data device indicates to the control means that data are being communicated and the device is still using the bus.

One of the important features of the invention is that additional data communication devices and/or control stations therefor may be added to the main circuit after it is initially run merely by cutting the cable and inserting the control station and/or encoder at the appropriate place. Further, the electrical cable may be utilized with the same or other power sources at times when the readings are not being carried out, such as fire alarms, burglar alarms, and the like.

Therefore, it is an object of the present invention to provide an improved self-sequencing data communications network.

It is another object of the present invention to provide a system for allocating the use of a common communications or data bus to a series of individual members of a series of data communications devices, wherein each data communication device in the system transmits data onto a common data line or bus and then signals the next data communication device to be activated.

It is yet another object of the present invention to provide a self-sequencing data communications network in which each data communication device in the system is not separately addressed from a common addressing source.

Another object of the present invention is to provide a self-sequencing data communications network in which the cost and complexity of the equipment required to remote locations and unused time is minimized.

Yet another object of the present invention is to provide a self-sequencing data acquisition system in which additional stations can easily be added to the existing system with a minimum of effort and at any point so desired.

Other objects and a fuller understanding of the invention will become apparent from reading the following detailed description of a preferred embodiment along wit the accompanying drawings in which.

DETAILED DESCRIPTION OF A PREFERRED EMBODIMENT

Figure 1:
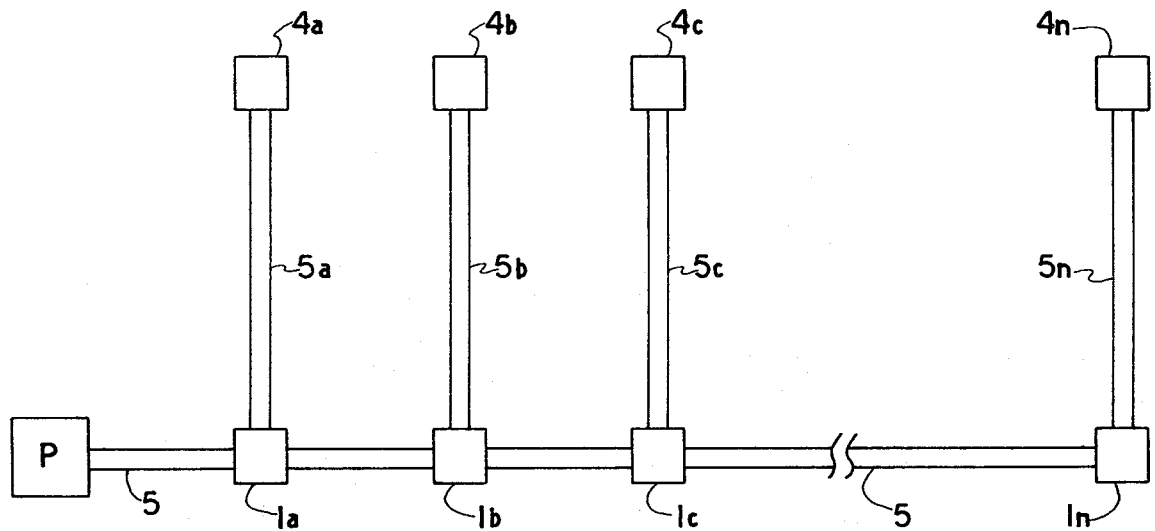
FIG. 1 is an electrical schematic generally illustrating the overall concept of the present invention.

Turning now to the drawings, as illustrated in FIG. 1, each of a series of data communicating devices 4a, 4b, 4c ... 4n, is connected to a corresponding control station 1a, 1b 1c ... 1n by a branch cable 5. A main electrical cable 3 connects the control stations 1a, 1b, 1c ... 1n, in serial fashion. Initiation of a reading sequence by the impression of a proper voltage and/or current from a power source P onto the cable 3 causes each control station, starting with station 1a, to signal or initiate serial data from its respective data communication device 4a. At the end of its transmission of data, the data communication device 4a will stop drawing current. This lack of current flow will be immediately sensed at the control station 1a, which then transmits a control signal to the next control station 1b, thus initiating its data communication device 4b to transmit data onto the cable 3. At the end of transmission by data communication device 4b, the control station 1b signals the next-in-line control station 1c, and so on until all the communication devices have had the opportunity to communicate with the data bus.

Figure 2:
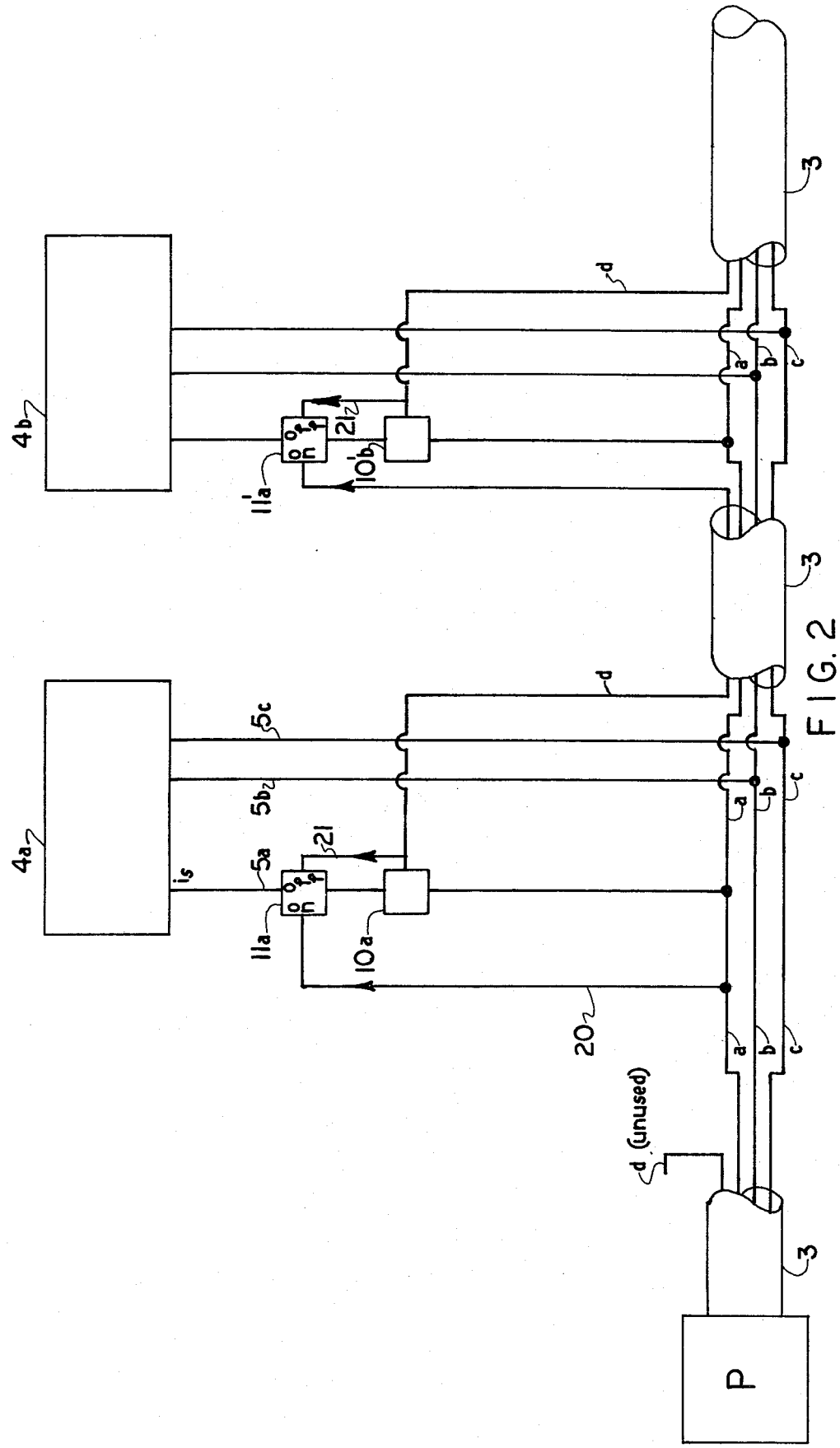
FIG. 2 is an electrical schematic of a preferred embodiment of the present invention as designed for a four wire cable.

Referring now to FIG. 2, lines a, b, c, and d form the main cable 3. At each control station 1a, 1b, 1c ... 1n, a branch cable 5 connects its corresponding data communication device 4 with the main cables. The branch cable supply line 5a is connected to the main cable supply line 3a, the data line or bus 5b is connected to the main cable data bus or line 3b and the main cable common line 3c is connected to the branch common line 5c. The fourth wire 3d of the main cable is utilized in a manner to be described hereinafter.

In this embodiment the first-in-line control station 1a includes a bi-stable switch 11 (transistor or flip-flop acting as a switch) connected directly to the supply line 3a by means of an auxiliary electrical line 20. This connection between the supply line 3a and the switch component 11 of the control station 1a is the only instance in the entire system that the trigger switch 11 must be connected to the supply line (as in the case of control station 1a by the auxiliary line 20). In other instances, the trigger switch 11 of one station 1n will be triggered responsive to the cessation of current flow through the previous data communication device 4n−1 as will be explained hereinafter.

Switch 11 is triggered from its "off" to its "on" position by a prescribed trigger voltage level and/or current level from the voltage source (for instance 12 volts). The corresponding data communication device 4 then feeds data through data line 5b onto the main data bus or line 3b. Upon completion of its data transmission the data communication device 4 stops drawing power through line 5a. This cessation of power draw is sensed by the sensing element 10 which detects the power being drawn to be below a prescribed level, at which point the switch 11 is triggered off by a signal through line 21 and the next-in-line switch 11a of the succeeding control station 1b is triggered on. It should be pointed out at this time that in the preferred embodiment the data communication device 4 is selected that operates responsive to the receipt of 9 volts or more. Further the device 4 is of a type which commonly includes or has built therein a silicon controlled rectifier or similar device which determines that the data communication is completed and switches to an alternate state, so that the data communication device 4 no longer draws current.

This cessation of current flow is detected at each control station 1 by a current sensing technique such as illustrated in element 10, which may be an optoisolator, Hall effect switch or other similar well-known device. When this current sensing element 10 detects that the $i_s$ of the supply line is below a certain level, the switch 11 is triggered off, and the next switch 11b of control station 1b is triggered on through the fourth line or the signal line d of the cable 3.

Obviously, if a data communication device 4 is missing or malfunctions and draws no current from the outset, the control station is effectively passed over, triggering the next control station very quickly. It should be pointed out that the reason that control station 1a is activated before 1b and control station 1b before 1c is that control station 1a must pass on a trigger pulse (or a supply voltage in the three wire embodiment referred to hereinbelow) to the next-in-line control station to permit the latter to operate. Therefore the control stations are arranged to operate in their prescribed sequence.

Although not required for the operation of the present invention, as a failsafe feature it may be necessary or desirable to put in a time-out component (not shown) in the current sensing element so that if a short circuit or device malfunction occurs during the readout and causes the data device to "hang up" while drawing current, after a prescribed time the current sensing element 10 will act as if the current had dropped below the prescribed current level and turn off the corresponding control station, simultaneously turning on the next-in-line control station. Such a timed disconnect feature could be utilized easily and would be within the skill of a person in the art.

As the data communication devices 4 have high impedance inputs, (i.e. they electrically appear to have disconnected themselves from the supply line) when they are not transmitting, no line-disconnect feature is shown in FIG. 2. However, if a communication device utilized is otherwise constructed, equivalent performance will be obtained by arranging that supply line 5a be connected to ground while the device wants to avail itself of the opportunity to use the bus. As stated hereinabove, an event such as the change of supply voltage to a desired level triggers the first control station 1a to initiate a sequence of readings from the entire line. In order to retrigger the supply line the voltage must again go from a low level to a high level, but the supply line could be held high after a reading cycle and a "read" signal in the form of a brief negative pulse could be utilized to institute an automatic re-read after a power loss or at any other time.

In another alternate construction of the invention the voltage from the supply line can be diverted from the main line to each branch line in turn and be temporarily withheld from downstream stations. This permits the use of simpler three-wire cable, but because each control station adds a voltage drop to the main supply line the number of stations is limited for any given system supply voltage.

It will be recognized by those skilled in the art, for example, that although it is perhaps preferable to use a multi-wire cabling system, one might instead arrange for a given data communications device to impress its transmitted data on the supply line, then arrange to monitor the resulting modulation on the supply line by any of several conventional techniques. Thus constructed, the system would not require that the data line and supply line be separate and very simple wiring could be used such as a twisted pair or a single wire with an earthed "common" return path.

Figure 3:
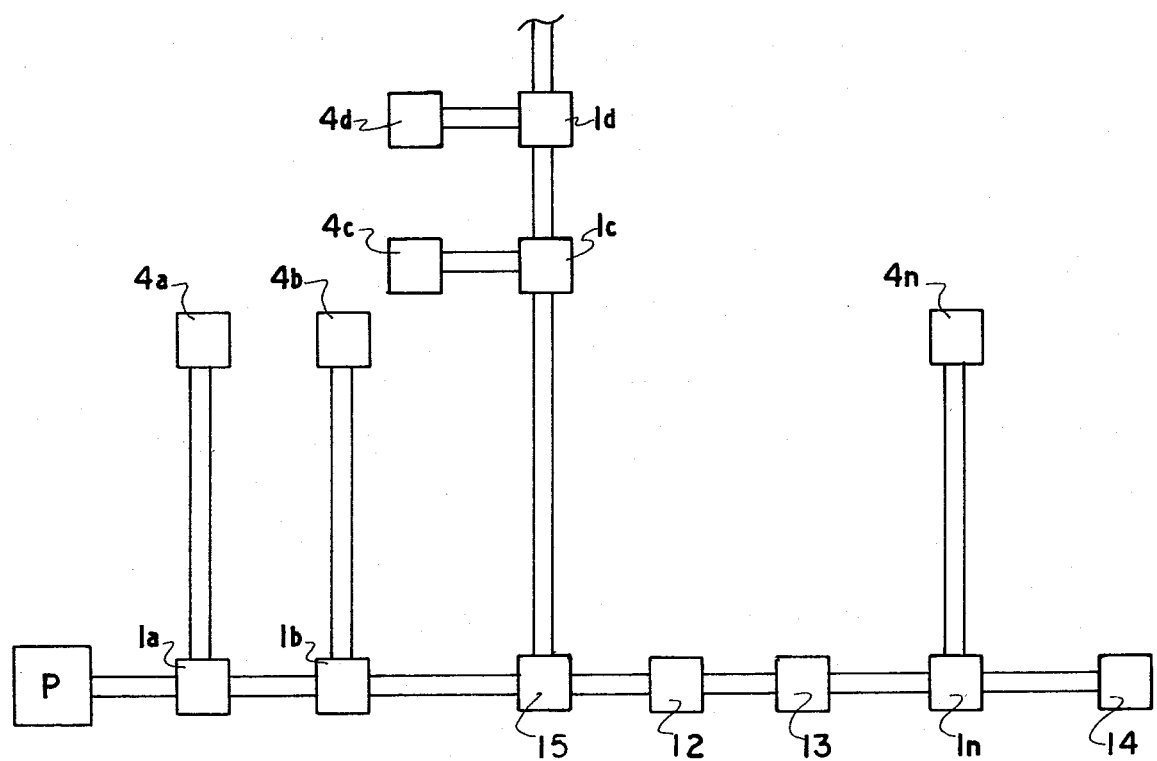
FIG. 3 is a schematic diagram illustrating generally the present invention with alternative devices added therein.

In FIG. 3 there is illustrated generally the manner in which a system may be set up including branchers 15 which obtain all of the readings from the branch line 22 prior to allowing the current to continue on downstream past the point of brancher 15. Additionally, there may be provided boosters 12 which amplify or reshape the data signals and identifiers 13 which themselves put out data on the data line as if they were data communication devices, yielding, however, no variable reading, merely a pre-set data input consisting of an identifier code. At the end of the entire circuit is shown a terminator 14 in effect a special type of identifier having no pass-through capability which by sending a preset code indicates back along the data bus 3b that the entire sequencing has been completed.

It should be noted further that the system described herein can be arranged in a single string of control stations possibly having one or more branches, or alternatively may be arranged in a "ring" or continuous loop which may also have one or more radial branches. In either case, once initiated the sequencing described above will proceed according to the predetermined sequence.

Note that although no addressing is required to activate or elicit responses from data devices in the string using the present invention, nothing precludes the use of addresses in any data transmitted by a device once the present invention gives it access to the bus. Thus when given the bus by the present invention any data device can selectively address any other device (or all non-selectively if desired) all devices may listen to the bus and take appropriate action responsive to their own individual addresses, but may only transmit to the bus as in reply when the opportunity is provided in sequence by the present invention.

There has been described in detail hereinabove a preferred embodiment and various alternates. However, it should be understood that other variations are possible within the scope of the present invention which is set forth in the following claims.

What is claimed is:

1. A self-sequencing data bus allocation system for obtaining data from a plurality of data communication devices in accordance with a prescribed sequence and without separately addressing each data communication device, said data communication devices being of the type which are activated by the receipt of power at a prescribed level to transmit data out along a data line, then become deactivated when all available data has been transmitted and cease to draw current, said system comprising:

(a) an electrical power source having a multi-line, main electrical cable emanating therefrom;
(b) said multi-line, main electrical cable including a supply line and at least one data line;
(c) a plurality of multi-line electrical cable branches, each of said branches having at least a supply line and at least one data line connecting the corresponding lines of said main electrical cable with one of said data communication devices;
(d) a plurality of control means, each of said control means being connected to at least the supply line in one of said cable branches, whereby said power source is connected by said control means with a first one of said control means for the activation of the corresponding data communication device and thereafter interconnected with the succeeding downstream control means;
(e) each of said control means including:
  (i) a switching means positioned in the cable branch supply line between said main cable supply line and said communication device being served by said branch cable and being operable between a normal "off" position and a second "on" position responsive to the receipt of a prescribed signal for temporarily connecting said corresponding data communication device to said main electrical cable and supplying power thereto;
  (ii) a current sensing means in said cable branch supply line for detecting the level of current being supplied to the corresponding one of said data communication devices;
  (iii) a control signal being generated by said current sensing means and transmitted through said main cable to the switching means of the next downstream control means responsive to a drop in the current below a prescribed level; and
  (iv) the switching means of the control means corresponding to the communication device which has just been read being returned to said normal "off" position responsive to the sensing by said sensing means that the current through said branch cable has dropped below a prescribed level.

2. The system according to claim 1 wherein said electrical cable further includes a signal line extending between each upstream current sensing means and each downstream switching means through which said control signal is transmitted.

3. The system according to claim 1 wherein an auxiliary electrical wire connects said main cable supply line with the first-in-line switching means, whereby the first switching means is activated responsive to the receipt of a power signal above a prescribed level.

4. A data bus allocation system for communicating data between a plurality of data communication devices of the type which are activated by the receipt of power at a prescribed level to transmit data out along a data line, then become deactivated when all available data has been transmitted and cease to draw current and a central point and/or other of said data communication devices comprising:

(a) a main electrical cable having one end connected to said central point and including at least a supply line and a data bus;
(b) said central point including a source of electrical power;
(c) a branch cable having at least a supply line and a data line connecting each of said data communication devices with said main cable and wherein each branch supply line is connected to said main cable supply line and each branch data line is connected to said main cable data bus;

(d) a control means associated with each branch cable, said control means collectively operating to sequentially deliver power from said power source to said plurality of data communication devices in a prescribed order, said prescribed order being maintained by the activation of a downstream control means responsive to the cessation of current above a prescribed level through the immediately preceding upstream control means.

5. The system according to claim 4 wherein each control means includes a switching means therein for selectively connecting the supply line of said main cable with the corresponding data communication device to supply power thereto.

6. The system according to claim 5 wherein the first-in-line one of said switching means is activated responsive to the receipt of a trigger signal on said supply line from said power source.

7. The system according to claim 6 wherein the remaining ones of said switching means are each activated responsive to the cessation of current being drawn by the immediate upstream one of said data communication devices.

8. A method for allocating the use of a data bus to individual members of a series of data communication devices comprising the steps of:

(a) generating voltage and current from a power source onto a main electrical csable which includes at least a supply line and a data bus;
(b) supplying a trigger signal onto said supply line;
(c) sensing said trigger signal at a first control station;
(d) activating a first one of said data communication devices by providing power thereto from said power source responsive to said trigger signal to supply data onto said data bus;
(e) sensing the cessation of power drain of said first data communication device at completion of data transmission;
(f) turning off said first data communication device and transmitting a control signal to a second control station responsive to step (e);
(g) sensing said control signal at said second control station;
(h) activating said second data communication device by providing power thereto from said power source responsive to said control signal to supply data onto said data bus;
(i) repeating steps (e) through (h) until all members of said series have had access to said data bus.

* * * * *